United States Patent
Lee et al.

(10) Patent No.: US 8,106,928 B2
(45) Date of Patent: Jan. 31, 2012

(54) METHOD OF DISPLAYING IMAGE IN IMAGE DISPLAY DEVICE USING SEQUENTIAL DRIVING METHOD

(75) Inventors: Won-yong Lee, Suwon-si (KR);
Young-chol Lee, Gunpo-si (KR);
Kye-hoon Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 954 days.

(21) Appl. No.: 11/108,810

(22) Filed: Apr. 19, 2005

(65) Prior Publication Data

US 2006/0012608 A1 Jan. 19, 2006

(30) Foreign Application Priority Data

Jul. 15, 2004 (KR) ......................... 10-2004-0055077

(51) Int. Cl.
*G09G 5/10* (2006.01)
(52) U.S. Cl. ........................ 345/690; 345/589
(58) Field of Classification Search ............... 345/87–89, 345/690, 691, 77, 82, 98, 102, 589
See application file for complete search history.

(56) References Cited

U.S. PATENT DOCUMENTS

| | | | |
|---|---|---|---|
| 5,311,169 A * | 5/1994 | Inada et al. ....................... 345/77 |
| 5,828,362 A | 10/1998 | Takahashi et al. |
| 6,392,656 B1 | 5/2002 | Someya et al. |
| 6,724,934 B1 | 4/2004 | Lee et al. |
| 6,750,874 B1 | 6/2004 | Kim |
| 6,870,523 B1 | 3/2005 | Ben-David et al. |
| 7,176,879 B1* | 2/2007 | Yoshihara et al. ............ 345/102 |
| 2002/0063670 A1 | 5/2002 | Yoshinaga et al. |
| 2002/0070914 A1* | 6/2002 | Bruning et al. ................ 345/102 |
| 2003/0214725 A1* | 11/2003 | Akiyama ........................ 359/640 |
| 2005/0088625 A1 | 4/2005 | Imade |
| 2005/0116961 A9* | 6/2005 | Edge et al. ..................... 345/600 |
| 2007/0127237 A1 | 6/2007 | Shimaoka et al. |

FOREIGN PATENT DOCUMENTS

JP 2002-229531 8/2002

(Continued)

OTHER PUBLICATIONS

Korean Office Action dated Mar. 23, 2006 issued in KR 2004-55077.

(Continued)

*Primary Examiner* — Yong H Sim
(74) *Attorney, Agent, or Firm* — Stanzione & Kim, LLP

(57) ABSTRACT

An image display method of improving brightness of an output image in an image display device using a sequential driving method and a plurality of single-color light sources. The image display method includes extracting a white color component from the primary color image signals, calculating a period to display the white color component, converting the primary color image signals into shortened primary color image signals and a white color image signal based on the period to display the white color component, and driving the single-color light sources together during a period to display the white color image signal and sequentially driving the single-color light sources during a period to display the shortened primary color image signals. The brightness of output images is improved by displaying the white color image signal by simultaneously driving the single-color light sources based on a ratio of a lowest gradient to a highest gradient of the primary color signals.

18 Claims, 5 Drawing Sheets

FOREIGN PATENT DOCUMENTS

| | | |
|---|---|---|
| JP | 2002-318564 | 10/2002 |
| JP | 2003-280607 | 10/2003 |
| JP | 2005-134482 | 5/2005 |
| KR | 1996-15023 | 5/1996 |
| KR | 2003-49829 A | 6/2003 |
| WO | WO 01/37249 * | 5/2001 |
| WO | 2005/073952 A1 | 8/2005 |

OTHER PUBLICATIONS

Dutch Search Report dated Mar. 31, 2006 issued in NL 1029429.
JP Office Action issued Apr. 26, 2011 in JP Application No. 2005-204663.
JP Office Action issued Sep. 20, 2011 in JP Patent Application No. 2005-204663.

* cited by examiner

METHOD OF DISPLAYING IMAGE IN IMAGE DISPLAY DEVICE USING SEQUENTIAL DRIVING METHOD

CROSS-REFERENCE TO RELATED APPLICATIONS

This application claims the priority under 35 U.S.C. §119 of Korean Patent Application No. 10-2004-55077, filed on Jul. 15, 2004, in the Korean Intellectual Property Office, the disclosure of which is incorporated herein in its entirety by reference.

BACKGROUND OF THE INVENTION

1. Field of the Invention

The present general inventive concept relates to an image display device with a sequential driving method, and more particularly, to an image display method to improve brightness of an output image of an image display device using a sequential driving method and a plurality of single-color light sources.

2. Description of the Related Art

Color display devices, such as plasma display panels (PDPs) and micro display (MD) devices, such as liquid crystal display (LCD) devices, liquid crystal on silicon (LCoS) devices, and digital micro mirror devices (DMDs), are widely used for computer monitors and TV sets.

In the display devices, a color image is realized by sequentially driving primary color image signals (red, green, and blue image signals) obtained from an original image signal at such a high speed to be undetectable to humans. A projection system uses a high intensity arc lamp as a light source and filters all colors except red, green, and blue from a light beam generated by the light source. Since an optical transport system for simultaneously displaying three primary color images requires three light sources and three optical paths, the optical transport system is heavy and large.

The weight of the optical transport system can be reduced by sequentially driving the three primary color image signals using a color wheel or a color filter with a single light source and by using a light path in common.

As illustrated in FIG. 1, the display devices generate RGB optical signals by sequentially filtering colors from an optical signal generated by one light source using a color wheel to realize lightweight devices, and use a conventional sequential driving method to sequentially drive the RGB optical signals.

However, according to a characteristic of the conventional sequential driving method, since an optical signal generated by one light source is divided into at least 3 signals, brightness of images output from the display devices is lowered. That is, the intensity of the images is only a third of the total light intensity due to the reflectivity of the color wheel or ribs of the color wheel. Accordingly, the display devices use a high power lamp or a high power electrode to have higher output optical intensity than a cathode ray tube.

To avoid large amounts of power consumption and heat generation problems due to the use of the high power lamp or the high power electrode, 4-color display devices enhancing brightness of output images by adding a white color component to 3 primary color components, as shown in FIG. 2, have been developed. The white color component can be obtained by projecting or reflecting the optical signal generated by the light source through or from a white color filter.

A conventional method of enhancing brightness of output images by adding a white color filter is disclosed in U.S. Pat. No. 5,233,385 in the name of Texas Instrument Incorporated entitled "White Light Enhanced Color Field Sequential Projection."

A conventional device using the conventional method disclosed in U.S. Pat. No. 5,233,385 includes a white color filter in addition to 3 color filters, such as red (R), green (G), and blue (B) filters, and the brightness of output images can be enhanced in proportion to a size of the white color filter.

However, this conventional method of enhancing brightness deteriorates color saturation of pixels of an output image while enhancing the brightness of the output image since the white color filter enhances the brightness of a white color component, i.e., a non-chromatic component.

Another conventional method of enhancing brightness of an output image is disclosed in U.S. Pat. No. 5,929,843 in the name of Cannon Kabushiki Kaisha entitled "Image Processing Apparatus Which Extracts White Component Data."

In this conventional method, 4 dots, such as red (R), green (G), blue (B), and white (W) dots, are used as a unit for representing a pixel in an LCD device, as shown in FIG. 3. Here, RGB data is transferred into the RGB dots, a white color component is extracted from the RGB data, and the white color component is transferred into the white dots. In this conventional method, the white color component is generated by non-linearly converting least common red, green, and blue data.

In this conventional method, white color complementing using the color wheel is performed in pixel units, and the size of the white color component can be determined according to an image signal. However, maintenance of color saturation to avoid a monochromatic tendency due to the addition of the white color component has not been considered. Therefore, when the brightness of an output image is increased, the color saturation is not maintained.

Recently, a conventional image display device for sequentially driving optical signals using LEDs, which are single-color light sources, has been developed. For example, a projection display system using LED light sources is disclosed in Korea Patent Publication No. 2002-82850. Here, a single-color light source, such as an LED or a laser diode, generates an optical signal having a shorter wavelength band than an optical signal generated by a white color light source, and singular in number. When an LCD is used as a display element, 3 RGB LEDs are sequentially driven, and a separate color filter is unnecessary for the LCD. In a conventional sequential driving method using this conventional image display device, driving of the single-color light sources is temporally limited, and a bright screen cannot be obtained due to the temporal limitation.

SUMMARY OF THE INVENTION

The present general inventive concept provides an image display method of enhancing brightness of an output image without deteriorating color saturation in an image display device using a sequential driving method and two or more single-color light sources.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing an image display method of an image display device having respective single-color light sources corresponding to at least two primary color image signals, the method including extracting a white color component from the primary color image signals, calculating a period to display the white color component, converting the primary color image signals into shortened primary color image signals and a white color image signal based on the period to display the white color component, and driving the single-color light sources together during a period to display the white color image signal and sequentially driving the single-color light sources during a period to display the shortened primary color image signals.

The white color image signal may be maintained at a highest possible gradient of the primary color image signals during the period to display the white color image signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
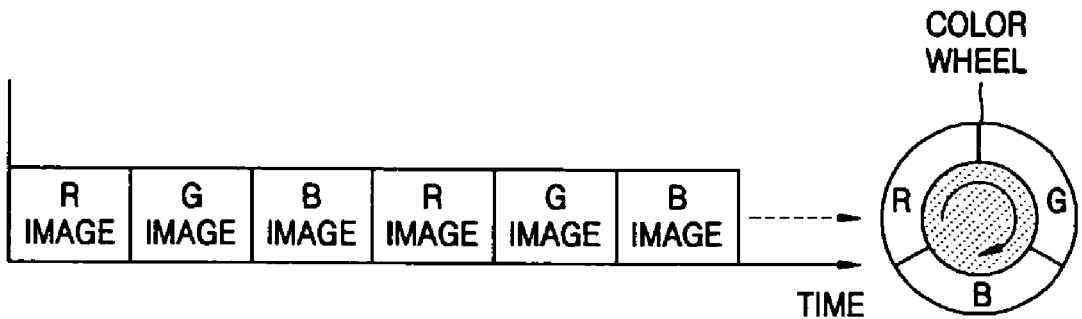
FIG. 1 illustrates a conventional sequential driving method of an image display device using a color wheel.
Figure 2:
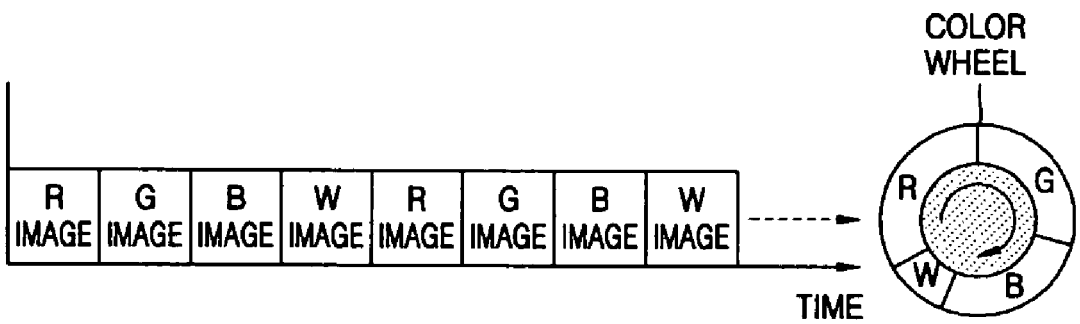
FIG. 2 illustrates another conventional sequential driving method of an image display device using a color wheel.
Figure 3:
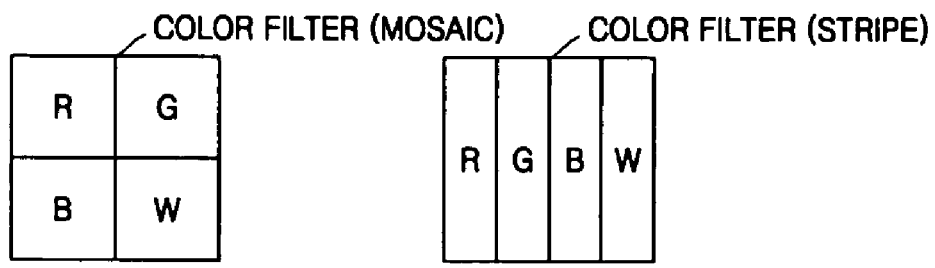
FIG. 3 illustrates pixel configurations of a conventional image display device using a color filter.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 4:
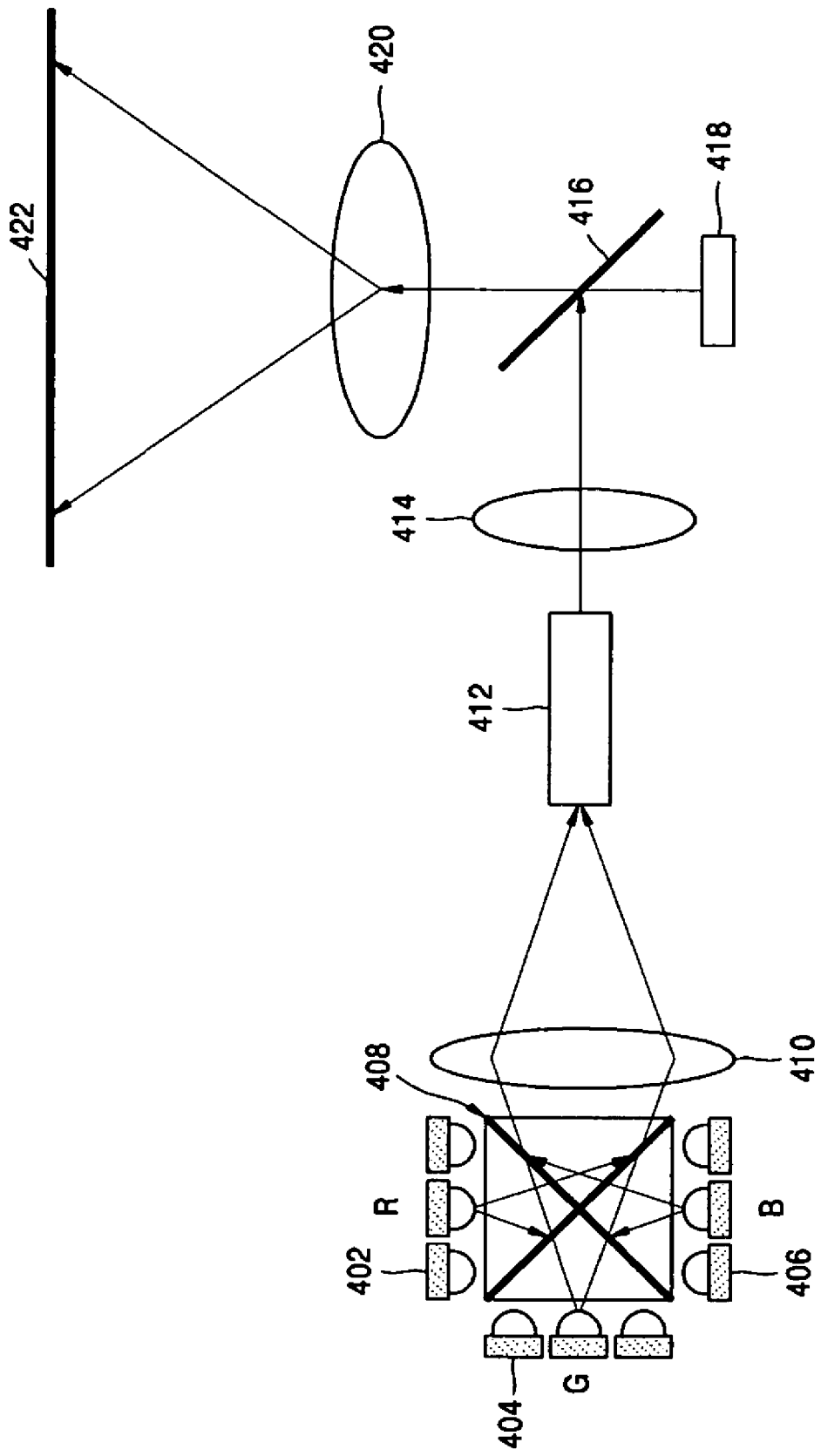
FIG. 4 is a schematic diagram of a projection system according to an embodiment of the present general inventive concept.

FIG. 4 is a schematic diagram of a projection system according to an embodiment of the present general inventive concept. The projection system includes RGB LEDs 402, 404, and 406, each radiating a single color light beam of red (R), green (G), and blue (B), respectively.

The RGB single color light beams radiated by the RGB LEDs 402, 404, and 406 are projected along a predetermined path by a color combiner 408, condensed by a condensing lens 410, and transmitted to a light tunnel 412.

The RGB single color light beams have a uniform distribution after passing through the light tunnel 412 and are transmitted to a micro display (MD) element 418 after passing through a relay lens 414 and a polarizing plate 416. The polarizing plate 416 changes a path of the RGB single color light beams according to a phase of the incident beams, reflects the RGB single color light beams projected through the relay lens 414 to the MD element 418, and transmits the RGB single color light beams output from the MD element 418 to a projection lens 420. The projection lens 420 projects an image formed by the MD element 418 onto a screen 422.

Figure 5:
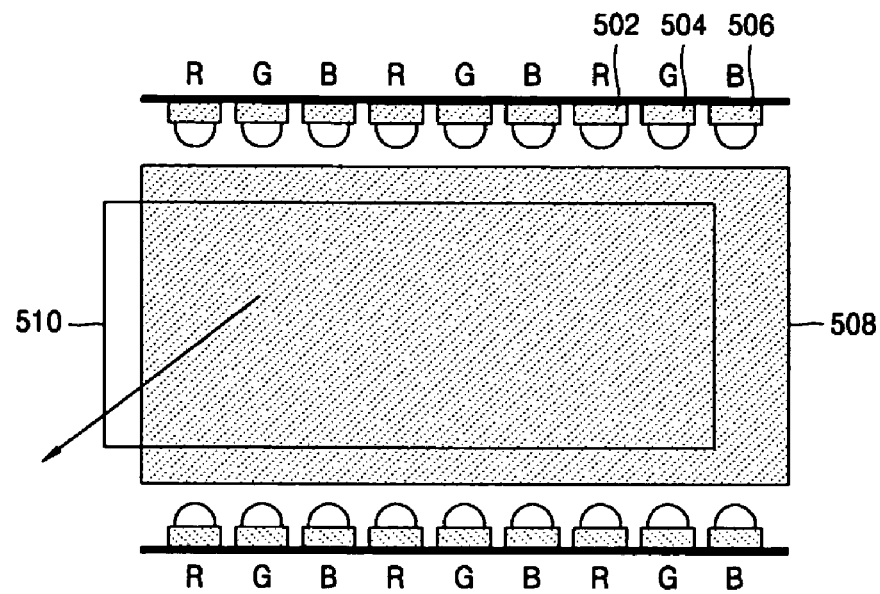
FIG. 5 is an image display device according to an embodiment of the present general inventive concept.

FIG. 5 is an image display device according to an embodiment of the present general inventive concept. FIG. 5 shows an image display device in which an LED back light 508 and an LCD panel 510 are adopted.

The LED back light 508 is placed behind the LCD panel 510 and is a light source. The LED back light 508 may be a cold cathode fluorescent lamp (CCFL) or a white LED. However, RGB single-color light sources, such as LEDs 502, 504, and 506, radiating primary colors are additionally used in order to use a sequential driving method in the image display device according to an embodiment of the present general inventive concept.

Single color light beams radiated by the primary color LEDs 502, 504, and 506 are diffused on the backlight 508 and projected onto the LCD panel 510 placed in front of the backlight 508. The primary color LEDs 502, 504, and 506 are sequentially driven, and images corresponding to the respective primary colors are sequentially displayed on the LCD panel 510. All of the primary color LEDs 502, 504, and 506 can be driven simultaneously to display a white image on the LCD panel 510. The sequential driving method is described in greater detail below.

The image display device of FIG. 5 and the projection system of FIG. 4 illustrate separately existing light sources corresponding to RGB primary colors, but are not limited thereto. More or different primary colors may be used in order to extend a color presentation range of the image display device and the projection system.

The image display device of FIG. 5 and the projection system of FIG. 4 illustrate LEDs being used as single-color light sources, but are not limited thereto. Any other type of single-color light source, such as a laser diode, can be alternatively used.

Figure 6:
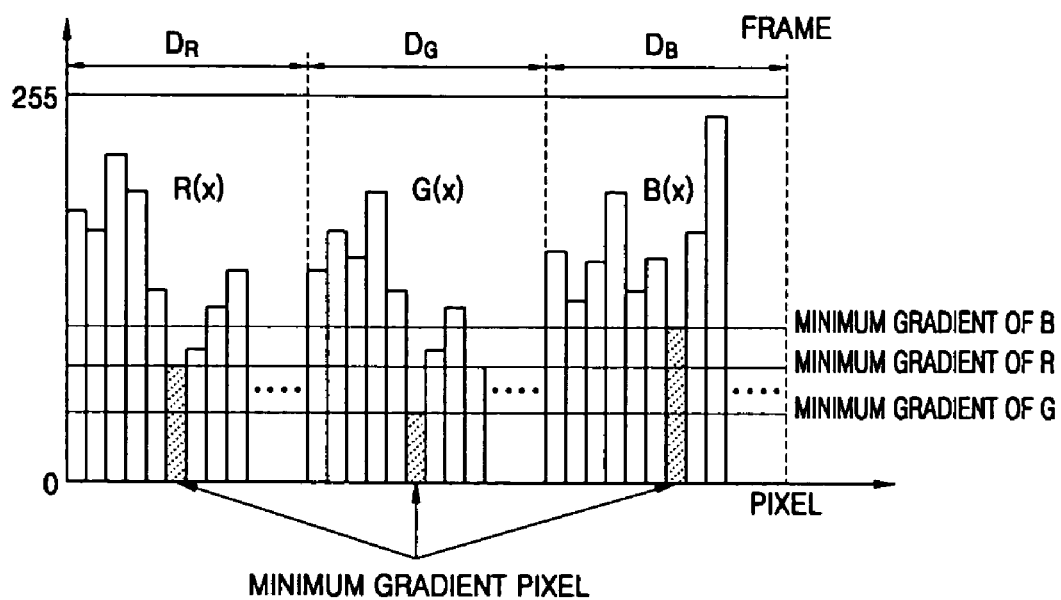
FIG. 6 is a graph illustrating gradients of R, G, and B image signals over a display period in an RGB sequential driving method.

FIG. 6 is a graph illustrating a gradient of each image signal over a display period in an RGB sequential driving method. In FIG. 6, a general-use 8-bit driving method is described as an example. Each pixel of the image display device has an independent gradient, and in the sequential driving method, each pixel displays RGB gradients sequentially.

In FIG. 6, R(x), G(x), and B(x) indicate gradients of R, G, and B image signals, and R_min, G_min, and B_min indicate minimum gradients of the R, G, and B image signals.

FIG. 6 illustrates a case where a minimum gradient of the G image signal is the lowest of the minimum gradients of the R, G, and B image signals. Here, $D_R$, $D_G$, and $D_B$ are presentation periods allocated to the respective R, G, and B image signals in the sequential driving method.

Figure 7:
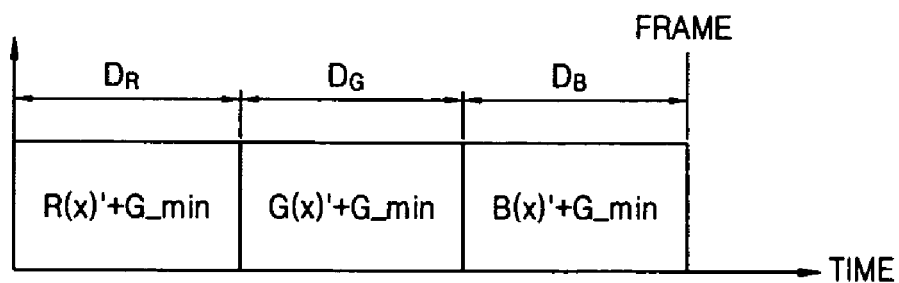
FIG. 7 is a diagram illustrating extraction of a white color component from the R, G, and B image signals.

FIG. 7 is a diagram illustrating extraction of a white color component from the R, G, and B image signals. In this embodiment, the white color component is extracted based on the minimum gradients of the R, G, and B image signals. A lowest minimum gradient S is the lowest of the minimum gradients of the R, G, and B image signals, as shown in Equation 1 below.

[Equation 1]

$$S = \text{MIN}(R\_\min, G\_\min, B\_\min)$$

R(x)', G(x)', and B(x)' are adjusted gradient values of the R, G, and B image signals obtained by subtracting the lowest minimum gradient S from R(x), G(x), and B(x) when the white color component is extracted, as shown in Equation 2 below.

[Equation 2]

$$R(x)' = R(x) - S,$$

$$G(x)' = G(x) - S,$$

$$B(x)' = B(x) - S$$

Figure 8:
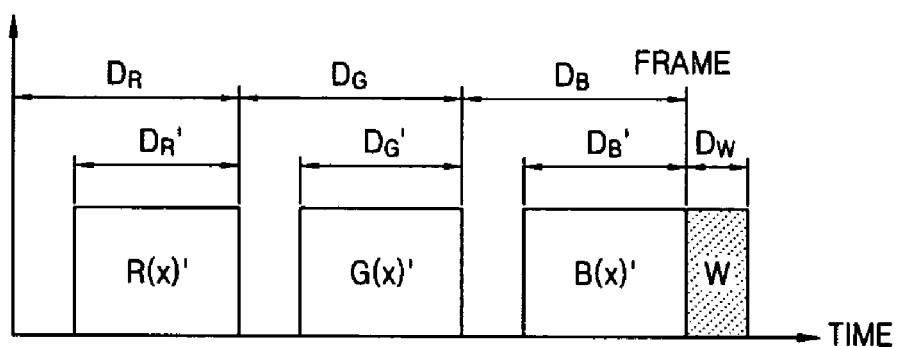
FIG. 8 is a diagram illustrating calculation of a display time to display the white color component.

FIG. 8 is a diagram illustrating calculation of a display period to display the white color component. In this embodiment, when the white color component is displayed, all of the RGB single color light beams are simultaneously driven, and all pixels operate with maximum gradients. Therefore, the white color component is displayed by allocating a period corresponding to a ratio of the lowest minimum gradient S to a highest possible gradient to generate the white color component and reducing the display periods of the R, G, and B image signals accordingly. Periods DW_R, DW_G, and DW_B required to generate the white color component can be calculated as shown in Equation 3 below. As shown in Equation 3, the highest possible gradient value is 255.

[Equation 3]

$$D_{W\_R} = D_R * (S/255),$$

$$D_{W\_G} = D_G * (S/255),$$

$$D_{W\_B} = D_B * (S/255)$$

The time allocated to actually display the white color component is obtained by selecting the maximum of the three values obtained from Equation 3, as indicated by Equation 4 below.

[Equation 4]

$$D_W = \text{MAX}(D_{W\_R}, D_{W\_G}, D_{W\_B})$$

If the display periods of the R, G, and B image signals are all the same, $D_W = D_{W\_R} = D_{W\_G} = D_{W\_B}$ since $D_R = D_G = D_B$ in Equation 3. When the white color component is extracted, the display periods of the R, G, and B image signals are reduced as shown in Equation 5 below.

[Equation 5]

$$D_R' = D_R - D_{W\_R},$$

$$D_G' = D_G - D_{W\_G},$$

$$D_B' = D_B - D_{W\_B}$$

Figure 9:
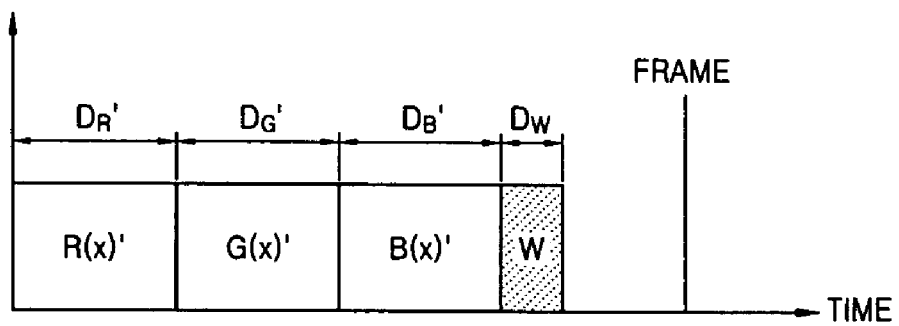
FIG. 9 is a diagram illustrating rearrangement of RGB components and the white color component.

FIG. 9 is a diagram illustrating rearrangement of RGB components and the white color (W) component. The rearrangement of the RGB components and the W component is performed by calculating R(x)', G(x)', B(x)', and W shown in FIG. 8 without overlapping them, and making a linear combination of R(x)', G(x)', B(x)', and W. When the RGB components and the W component are rearranged, it does not matter where the W component exists. That is, the RGB components and the W component can be arranged in the order RGBW, RGWB, RWGB, or WRGB.

Figure 10:
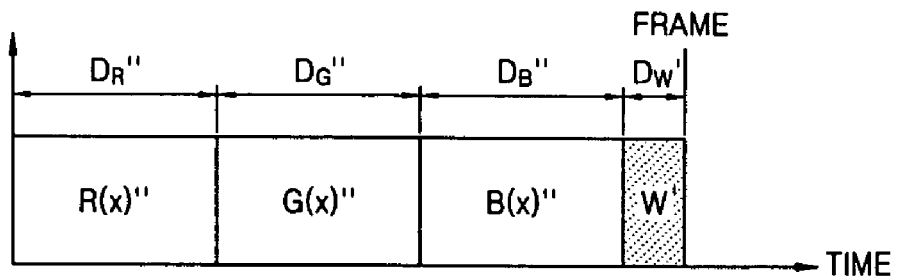
FIG. 10 is a diagram illustrating scaling of display periods of the RGB components and the white color component to fit one frame.

FIG. 10 is a diagram illustrating scaling of display periods of the RGB components and the W component to fit to one frame.

As illustrated in FIG. 9, in the linear combination obtained by rearranging the RGB components and the W component, a total period of the RGBW components is not equal to a frame period. Therefore, it is necessary to scale the display periods of the RGBW components so that the total period of the RGBW components is equal to the frame period. The scaling of the display periods of the RGBW components is performed by increasing the display periods with the ratios shown in Equation 6 below.

[Equation 6]

$$D_R'' = D_R'(D_R + D_G + D_B)/(D_R' + D_G' + D_B' + D_W),$$

$$D_G'' = D_G'(D_R + D_G + D_B)/(D_R' + D_G' + D_B' + D_W),$$

$$D_B'' = D_B'(D_R + D_G + D_B)/(D_R' + D_G' + D_B' + D_W),$$

$$D_{W\_R}' = D_{W\_R}(D_R + D_G + D_B)/(D_R' + D_G' + D_B' + D_W),$$

$$D_{W\_G}' = D_{W\_G}(D_R + D_G + D_B)/(D_R' + D_G' + D_B' + D_W),$$

$$D_{W\_B}' = D_{W\_B}(D_R + D_G + D_B)/(D_R' + D_G' + D_B' + D_W)$$

The time allocated to actually displaying the white color component is obtained by selecting the largest of the three values $D_{W\_R}'$, $D_{W\_G}'$, and $D_{W\_B}'$ obtained from Equation 6. The largest value $D_W'$ can be given by Equation 7 below.

[Equation 7]

$$D_W' = \text{MAX}(D_{W\_R}', D_{W\_G}', D_{W\_B}')$$

If the display periods of the R, G, and B image signals are all the same, $D_R'' = D_G'' = D_B''$ and $D_W' = D_{W\_R}' = D_{W\_G}' = D_{W\_B}'$ since $D_{W\_R} = D_{W\_G} = D_{W\_B}$ in Equation 6.

A gain used to improve brightness is a temporally increasing ratio applied to Equation 5 when scaling the display periods as illustrated in FIG. 10, and is represented by Equation 8 below.

[Equation 8]

$$\text{gain: } G = (D_R + D_G + D_B)/(D_R' + D_G' + D_B' + D_W)$$

If the display periods of the R, G, and B image signals are all the same, and if the lowest minimum gradient S is a half of the highest possible gradient, the gain to improve brightness is 1.5. In an extreme case, if the lowest minimum gradient S of an image is equal to the highest possible gradient, for example 255, the gain is 3. Since a higher value of the lowest minimum gradient S of an image results in a larger gain, contrast of the image can be increased by displaying a bright screen more brightly.

Figure 11:
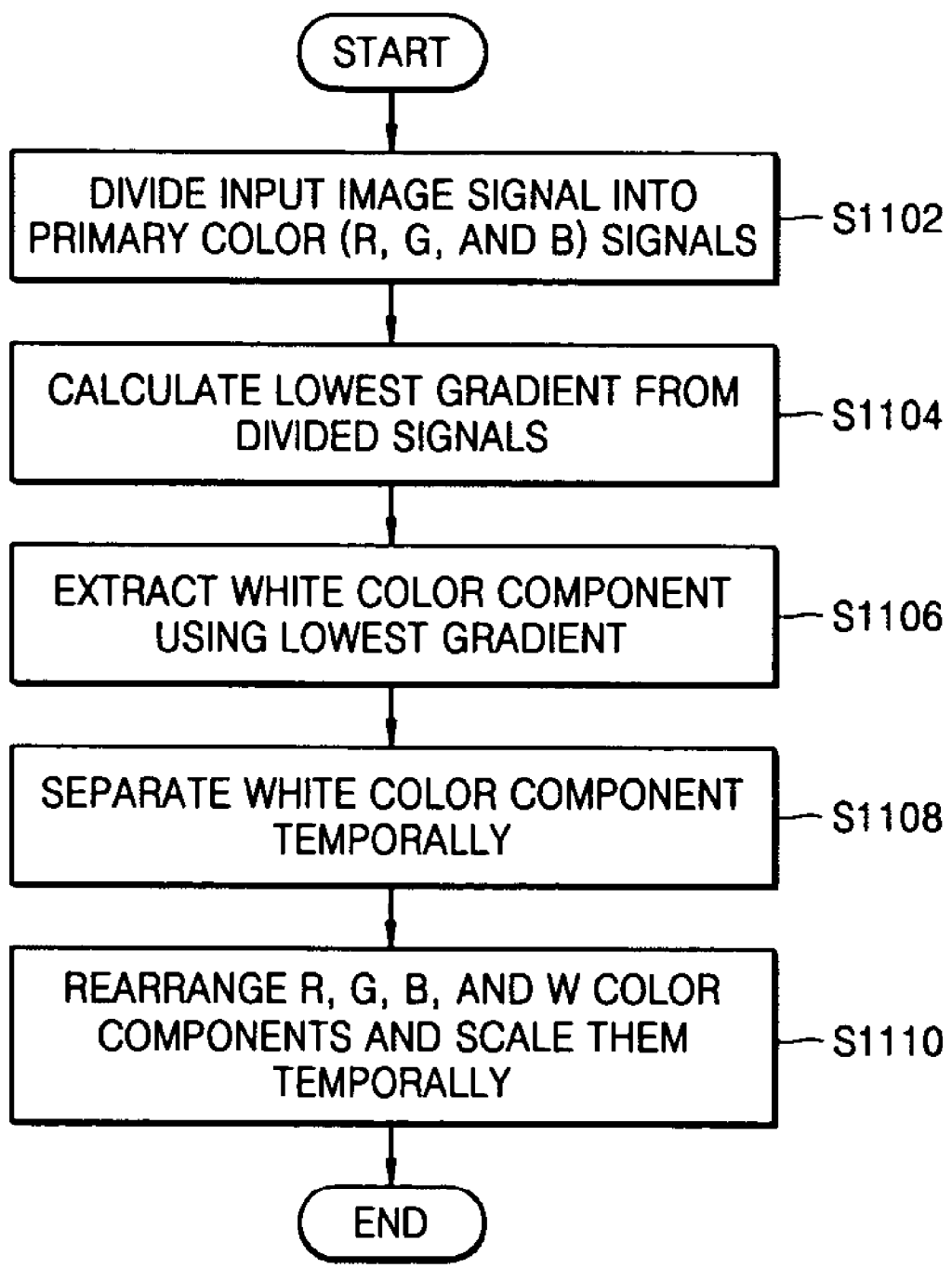
FIG. 11 is a flowchart illustrating an image signal display method according to an embodiment of the present general inventive concept.

FIG. 11 is a flowchart illustrating an image signal display method according to an embodiment of the present general inventive concept.

When an image signal is input, the image signal is divided into primary color (R, G, and B) signals at operation S1102.

The lowest minimum gradient S is calculated using Equation 1 from the primary color (R, G, and B) signals at operation S1104.

A white color component is extracted using the lowest minimum gradient S based on Equation 2 at operation S1106.

A period $D_W$ to display the white color component is calculated using Equation 3 at operation S1108.

The period $D_W$ to display the white color component is determined according to a ratio of the lowest minimum gradient S to the highest possible gradient and display periods are allocated to the R, G, and B image signals. The display periods allocated to the R, G, and B image signals are reduced by the period $D_W$ to display the white color component.

The RGBW components are rearranged and temporal scaling is performed by extending the display periods of the RGB components by a common factor based on a period corresponding to one frame at operation S1110.

A method of adjusting display periods of the R, G, B, and W image signals can be performed by adjusting periods to display colors with predetermined gradients. For example, in the projection system of FIG. 4 using the MD element 418, a sub field driving method is used, and the display periods of the R, G, B, and W image signals can be adjusted by adjusting a unit driving period allocated for a unit gradient. If the same unit driving period is applied to all gradient values in a range between 0 and 255, a driving period of each primary color can be adjusted by simply adjusting a unit driving period of each gradient. However, if gradient values in the range of 0 to 255 are divided into a plurality of categories, and if different unit driving periods are applied to the categories, adjustment of the display periods of the R, G, B, and W image signals may be more complicated.

The single-color light sources operate during respective periods corresponding to the color of the single-color light sources, i.e., display periods corresponding to the R, G, or B image signals, as calculated in Equation 6. $D_R''$, $D_G''$, and $D_B''$ are periods during which the single-color light sources sequentially operate, and $D_{W\_R}'$, $D_{W\_G}'$, and $D_{W\_B}'$ are periods during which all of the single-color light sources simultaneously operate, i.e., during $D_W'$ calculated in Equation 7. In an initial stage, if the display periods of the R, G, or B image signals are all the same, all of the single-color light sources simultaneously operate during $D_W'$.

FIGS. 6-11 illustrate RGB colors being used as primary colors, but are not limited thereto. The embodiments of the present general inventive concept can alternatively be applied to a case in which other primary colors are used.

As described above, according to the present general inventive concept, brightness of output images is improved by displaying a white color image by simultaneously driving all single-color light sources for a period corresponding to a ratio of a lowest gradient to a highest gradient of an image display device which sequentially drives the single-color light sources.

Also according to the present general inventive concept, brightness of output images can be improved without deterioration of color saturation by controlling a display period of a white color image based on a ratio of a lowest minimum gradient to a highest gradient of primary color image signals.

Also according to the present general inventive concept, brightness is improved by maximizing the use of limited light sources.

Also according to the present general inventive concept, since sufficient brightness can be realized using light sources with low intensity, a high power light source is unnecessary.

Also according to the present general inventive concept, brightness of output images can be improved by controlling display periods of primary color images and driving at least two single-color light sources together when a white color image is displayed by an image display device using a sequential driving method and single-color light sources.

Also according to the present general inventive concept, a sequential driving method can be applied to an image display device in which light sources corresponding to primary colors separately exist.

Also according to the present general inventive concept, a temporal limitation of a conventional sequential driving method can be overcome by simultaneously driving at least two single-color light sources or possibly all light sources to display a white color image.

Also according to the present general inventive concept, since an image display device uses single-color light sources, such as LEDs or laser diodes, and operates using a sequential driving method, a color filter or a color wheel since is unnecessary.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image display method of an image display device having respective single-color light sources corresponding to at least two primary color image signals, the method comprising:

extracting a white color component from the primary color image signals;

calculating time periods to display the white color component corresponding to each of the primary color image signals based on a calculated ratio of the lowest minimum gradient to a highest possible gradient of the primary color image signals and periods to display the primary color images;

defining the longest of the calculated time periods to display the white color component corresponding to the primary color image signals as the period to display the white color component, where the defined longest time period is selected from the calculated time periods that include at least two different time periods;

converting the primary color image signals into shortened primary color image signals and a white color image signal based on the period to display the white color component by reducing periods to display the primary color image signals according to the period to display the white color component to obtain the periods to display the shortened primary color image signals, obtaining a linear combination of the shortened primary color image signals and the white color image signal by combining the shortened primary color image signals and the white color image signal without overlapping the primary color image signals and the white color image signal, and generating the shortened primary color image signals and the white color image signal by temporally scaling the linear combination of the shortened primary color image signals and the white color image signal such that a sum of the periods to display the shortened primary color image signals and the white color image signal is equal to a period of a frame; and driving the single-color light sources together during a period to display the white color image signal and sequentially driving the single-color light sources during periods to display the shortened primary color image signals, wherein scaling the linear combination of the shortened primary color image signals and the white color image signal is performed by increasing the periods to display the shortened primary color image signals and the white color image signal with a predetermined ratio.

2. The method of claim 1, wherein the extracting of the white color component comprises:

extracting the white color component using a lowest minimum gradient of the primary color image signals during each frame.

3. The method of claim 1, wherein the image display device comprises a liquid crystal display (LCD).

4. The method of claim 1, wherein the image display device comprises a micro display (MD) element selected from the group consisting of an LCoS, a DMD, and a GLV.

5. The method of claim 1, wherein the single-color light source comprises a light source with a narrower wavelength band than a white color light source.

6. The method of claim 1, wherein at least two of the single-color light sources are driven during the period to display the white color image signal.

7. The method of claim 5, wherein the single-color light source comprises an LED or a laser diode.

8. The method of claim 6, wherein the white color image signal is maintained at a highest possible gradient of the primary color signals during the period to display the white color image signal.

9. A sequential driving method of a display device having a plurality of single-color light sources corresponding to a plurality of primary colors, the method comprising:
  converting an input image signal into a plurality of primary color signals and a white color component by dividing the input signal into the plurality of primary color signals, calculating time periods to display the white color component corresponding to each of the primary color image signals based on a calculated ratio of the lowest minimum gradient to a highest possible gradient of the primary color image signals and periods to display the primary color images, and defining the longest of the calculated time periods to display the white color component corresponding to the primary color image signals as the period to display the white color component, where the defined longest time period is selected from the calculated time periods that include at least two different time periods;
  rearranging the primary color signals and the white color component and scaling the time periods corresponding to the white color component and the plurality of primary colors to fit within the frame;
  displaying each primary color image signal by driving a respective single-color light source during a time period of a frame corresponding to the respective primary color image signal; and
  displaying the white color component by controlling a display period of a white color component based on a ratio of a lowest minimum gradient to a highest gradient of the primary color image signals and by driving all of the plurality of single-color light sources simultaneously during a time period of the frame corresponding to the white color component,
  wherein scaling the time periods corresponding to the white color component and the plurality of primary colors is performed by increasing the time periods corresponding to the white color component and the plurality of primary colors with a predetermined ratio.

10. The method of claim 9, wherein the plurality of primary color image signals comprises red, green, and blue image signals.

11. A method of increasing brightness of an output image of a display apparatus having single color light sources corresponding to at least two primary color image signals, the method comprising:
  controlling a display period of a white color image by calculating time periods to display the white color component corresponding to each of the primary color image signals based on a calculated ratio of the lowest minimum gradient to a highest possible gradient of the primary color image signals and periods to display the primary color images, and defining the longest of the calculated time periods to display the white color component corresponding to the primary color image signals as the period to display the white color component, where the defined longest time period is selected from the calculated time periods that include at least two different time periods, adjusting display periods of the primary color components according to the display period of the white color component, and scaling the display period of the white color component and the adjusted display periods of the primary color components to fit within a time frame; and
  simultaneously driving at least two of the single color light sources when the controlled white color image is displayed,
  wherein scaling the display period of the white color component and the adjusted display periods of the primary color components is performed by increasing the display period of the white color component and the adjusted display periods of the primary color components with a predetermined ratio.

12. A display apparatus, comprising:
  a plurality of single-color light sources, each single-color light source corresponding to one of a plurality of primary colors, the plurality of single-color light sources sequentially driven to output an image signal corresponding to each of the plurality of primary colors and simultaneously driven to output a white image signal based on a ratio of a lowest minimum gradient to a highest gradient of the primary color image signals and to scale the time periods corresponding to the white color component and the plurality of primary colors to fit within the frame,
  wherein scaling the time periods corresponding to the white color component and the plurality of primary colors is performed by increasing the time periods corresponding to the white color component and the plurality of primary colors with a predetermined ratio,
  wherein the time period corresponding to the white image signal is determined by calculating time periods to display the white color component corresponding to each of the primary color image signals based on a calculated ratio of the lowest minimum gradient to a highest possible gradient of the primary color image signals and periods to display the primary color images, and defining the longest of the calculated time periods to display the white color component corresponding to the primary color image signals as the period to display the white color component, where the defined longest time period is selected from the calculated time periods that include at least two different time periods.

13. The display apparatus of claim 12, wherein the white image signal is extracted from the image signals corresponding to the plurality of primary colors.

14. The display apparatus of claim 12, further comprising:
  a display unit to display the output image signals corresponding to the plurality of primary colors and the white image signal.

15. The display apparatus of claim 14, wherein the display unit comprises one of a micro display device and a liquid crystal display device.

16. A display apparatus, comprising:
  single color light sources corresponding to at least two primary color image signals, at least two of the single color light sources simultaneously driven during a display period based on a ratio of a lowest minimum gradient to a highest gradient of the primary color image signals that is determined by a controller that determines gradients of the primary color components to determine a display period of a white color component, determines a display period of the white color component according to the determined gradients of the primary color components, adjusts display periods of the primary color components according to the display period of the white color component, and scales the display period of the white color component and the adjusted display periods of the primary color components to fit within a time frame, wherein scaling the display period of the white color component and the adjusted display periods of the primary color components is performed by increasing the display period of the white color component and the adjusted display periods of the primary color components with a predetermined ratio, wherein the display period of the white color component is determined by calculating time periods to display the white color component corresponding to each of the primary color image signals based on a calculated ratio of the lowest minimum gradient to a highest possible gradient of the primary color image signals and periods to display the primary color images, and defining the longest of the calculated time periods to display the white color component corresponding to the primary color image signals as the period to display the white color component, where the defined longest time period is selected from the calculated time periods that include at least two different time periods.

17. A method of increasing brightness of an output image of a display apparatus having single color light sources corresponding to at least two primary color image signals, the method comprising:

extracting a white color image signal and a plurality of primary color signals from an input image signal;

rearranging the plurality of primary color signals and the white color image signal and scaling display periods corresponding to the white color image signal and the plurality of primary colors to fit within a frame;

controlling a display period of a white color image based on a ratio of a lowest minimum gradient to a highest gradient of the primary color image signals; and simultaneously driving at least two of the single color light sources when the controlled white color image is displayed, wherein scaling the display periods corresponding to the white color image signal and the plurality of primary colors is performed by increasing the display periods corresponding to the white color image signal and the plurality of primary colors with a predetermined ratio, wherein the display period of the white color image is determined by calculating time periods to display the white color component corresponding to each of the primary color image signals based on a calculated ratio of the lowest minimum gradient to a highest possible gradient of the primary color image signals and periods to display the primary color images, and defining the longest of the calculated time periods to display the white color component corresponding to the primary color image signals as the period to display the white color component, where the defined longest time period is selected from the calculated time periods that include at least two different time periods.

18. A method of enhancing brightness of an output image of a display apparatus, the method comprising:

adding a white color component to primary color components of an input image signal;

determining a time period of the white color component according to gradients of the primary color components;

adjusting time periods of the primary color components according to the time period of the white color component;

scaling the time period of the white color component and the adjusted time periods of the primary color components to fit within a time frame;

sequentially activating single-color light sources corresponding to each of the primary colors during the scaled time period of the respective primary color component; and simultaneously activating the single-color light sources corresponding to all of the primary colors during the scaled time period of the white color component, wherein scaling the time period of the white color component and the adjusted time periods of the primary color components is performed by increasing the time period of the white color component and the adjusted time periods of the primary color components with a predetermined ratio, wherein the display period of the white color component is determined by calculating time periods to display the white color component corresponding to each of the primary color image signals based on a calculated ratio of the lowest minimum gradient to a highest possible gradient of the primary color image signals and periods to display the primary color images, and defining the longest of the calculated time periods to display the white color component corresponding to the primary color image signals as the period to display the white color component, where the defined longest time period is selected from the calculated time periods that include at least two different time periods.

* * * * *